(12) United States Patent
Grivna

(10) Patent No.: US 8,526,558 B1
(45) Date of Patent: Sep. 3, 2013

(54) RECURSIVE RANGE CONTROLLER

(75) Inventor: Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/198,164

(22) Filed: Aug. 4, 2011

Related U.S. Application Data

(63) Continuation of application No. 11/403,509, filed on Apr. 12, 2006, now Pat. No. 8,073,042.

(60) Provisional application No. 60/671,388, filed on Apr. 13, 2005.

(51) Int. Cl.
*H04L 7/00* (2006.01)

(52) U.S. Cl.
USPC .......................................................... 375/372

(58) Field of Classification Search
USPC ................ 375/224–227, 273, 340, 346, 371, 375/373, 376–377, 267, 372; 324/500; 325/555; 327/292; 340/3.43, 3.44; 370/242; 379/14.01, 15.05
See application file for complete search history.

(56) References Cited

U.S. PATENT DOCUMENTS

| | | | |
|---|---|---|---|
| 3,646,517 A | 2/1972 | Waters et al. | |
| 3,893,072 A | 7/1975 | D'Antonio et al. | |
| 4,287,480 A | 9/1981 | Swift et al. | |
| 4,552,996 A * | 11/1985 | de Bergh | 379/24 |
| 4,668,922 A | 5/1987 | Crawford et al. | |
| 4,689,581 A | 8/1987 | Talbot | |
| 4,689,740 A | 8/1987 | Moelands et al. | |
| 4,812,783 A | 3/1989 | Honjo et al. | |
| 4,816,700 A | 3/1989 | Imel | |
| 4,817,199 A | 3/1989 | Wallraff | |
| 4,882,549 A | 11/1989 | Galani et al. | |
| 4,903,270 A | 2/1990 | Johnson et al. | |
| 4,949,051 A | 8/1990 | Viola | |
| 4,972,442 A | 11/1990 | Steierman | |
| 4,980,653 A | 12/1990 | Shepherd | |
| 4,980,899 A | 12/1990 | Troost et al. | |
| 5,001,712 A | 3/1991 | Splett et al. | |
| 5,008,635 A | 4/1991 | Hanke et al. | |

(Continued)

FOREIGN PATENT DOCUMENTS

| | | |
|---|---|---|
| JP | 287113 A1 | 11/1988 |
| JP | 291161 A1 | 11/1990 |

(Continued)

OTHER PUBLICATIONS

Harris, On the use of Windows for Harmonic Analysis With the Discrete Fourier Transform, 1978, Proceedings of the IEEE, vol. 66, Issue: 1, pp. 51-83.*

(Continued)

*Primary Examiner* — Juan A Torres

(57) ABSTRACT

A method and apparatus for detecting out-of-specification data streams and voltage controller oscillator operation. Data may be received over evaluation periods. Each evaluation period is segmented into n sub-periods. Each n sub-period has the same length. Each n sub-period spans a portion of the data. The corresponding data period starting at each of the n sub-period is evaluated. The sub-period interval counts may be stored in a first-in-first-out register.

18 Claims, 10 Drawing Sheets

(56) References Cited

U.S. PATENT DOCUMENTS

| | | | |
|---|---|---|---|
| 5,021,949 A | 6/1991 | Morten et al. |
| 5,036,216 A | 7/1991 | Hohmann et al. |
| 5,036,230 A | 7/1991 | Bazes |
| 5,036,300 A | 7/1991 | Nicolai |
| 5,059,925 A | 10/1991 | Weisbloom |
| 5,081,705 A | 1/1992 | Swanke |
| 5,095,280 A | 3/1992 | Wunner et al. |
| 5,126,690 A | 6/1992 | Bui et al. |
| 5,136,180 A | 8/1992 | Caviasca et al. |
| 5,142,247 A | 8/1992 | Lada, Jr. et al. |
| 5,144,254 A | 9/1992 | Wilke |
| 5,177,771 A | 1/1993 | Glassburn |
| 5,220,581 A | 6/1993 | Ferraiolo et al. |
| 5,233,314 A | 8/1993 | McDermott et al. |
| 5,237,699 A | 8/1993 | Little et al. |
| 5,249,206 A | 9/1993 | Appelbaum et al. |
| 5,256,989 A | 10/1993 | Parker et al. |
| 5,256,994 A | 10/1993 | Langendorf |
| 5,289,138 A | 2/1994 | Wang |
| 5,291,481 A | 3/1994 | Doshi et al. |
| 5,295,079 A | 3/1994 | Wong et al. |
| 5,307,381 A | 4/1994 | Ahuja |
| 5,329,252 A | 7/1994 | Major |
| 5,336,939 A | 8/1994 | Eitrheim et al. |
| 5,349,544 A | 9/1994 | Wright et al. |
| 5,357,204 A | 10/1994 | Knoll |
| 5,359,232 A | 10/1994 | Eitrheim et al. |
| 5,369,311 A | 11/1994 | Wang et al. |
| 5,371,772 A | 12/1994 | Al-Khairi |
| 5,389,826 A | 2/1995 | Sonobe |
| 5,398,262 A | 3/1995 | Ahuja |
| 5,408,682 A | 4/1995 | Ranner et al. |
| 5,412,349 A | 5/1995 | Young et al. |
| 5,444,405 A | 8/1995 | Truong et al. |
| 5,444,744 A | 8/1995 | Yamamoto et al. |
| 5,446,867 A | 8/1995 | Young et al. |
| 5,451,912 A | 9/1995 | Torode |
| 5,457,428 A | 10/1995 | Alder et al. |
| 5,481,697 A | 1/1996 | Mathews et al. |
| 5,487,093 A | 1/1996 | Adresen et al. |
| 5,488,627 A | 1/1996 | Hardin et al. |
| 5,497,126 A | 3/1996 | Kosiec et al. |
| 5,523,705 A | 6/1996 | Steele |
| 5,525,932 A | 6/1996 | Kelkar et al. |
| 5,532,636 A | 7/1996 | Mar et al. |
| 5,535,377 A | 7/1996 | Parks |
| 5,537,068 A | 7/1996 | Konno |
| 5,537,582 A | 7/1996 | Draeger |
| 5,546,563 A | 8/1996 | Chuang |
| 5,550,499 A | 8/1996 | Eitrheim |
| 5,550,515 A | 8/1996 | Liang et al. |
| 5,551,071 A | 8/1996 | Nakano et al. |
| 5,555,025 A | 9/1996 | McArthur |
| 5,559,502 A | 9/1996 | Schutte |
| 5,563,553 A | 10/1996 | Jackson |
| 5,589,782 A | 12/1996 | Sharpe-Geisler |
| 5,608,770 A | 3/1997 | Noguchi et al. |
| 5,610,955 A | 3/1997 | Bland |
| 5,614,869 A | 3/1997 | Bland |
| 5,630,148 A | 5/1997 | Norris |
| 5,633,865 A | 5/1997 | Short |
| 5,634,015 A | 5/1997 | Chang et al. |
| 5,638,016 A | 6/1997 | Eitrheim |
| 5,638,542 A | 6/1997 | Nikjou |
| 5,666,655 A | 9/1997 | Ishikawa et al. |
| 5,684,418 A | 11/1997 | Yanagiuchi |
| 5,684,434 A | 11/1997 | Mann et al. |
| 5,687,202 A | 11/1997 | Eitrheim |
| 5,689,196 A | 11/1997 | Schutte |
| 5,692,022 A | 11/1997 | Haulin et al. |
| 5,696,949 A | 12/1997 | Young |
| 5,703,537 A | 12/1997 | Bland et al. |
| 5,703,540 A | 12/1997 | Gazda et al. |
| 5,706,484 A | 1/1998 | Mozdzen et al. |
| 5,719,510 A | 2/1998 | Weidner |
| 5,724,007 A | 3/1998 | Mar |
| 5,815,042 A | 9/1998 | Chow et al. |
| 5,818,254 A | 10/1998 | Agrawal et al. |
| 5,872,910 A | 2/1999 | Kuslak et al. |
| 5,877,656 A | 3/1999 | Mann et al. |
| 5,946,300 A | 8/1999 | Wilbrod |
| 5,949,799 A | 9/1999 | Grivna et al. |
| 5,952,888 A | 9/1999 | Scott |
| 6,003,118 A | 12/1999 | Chen |
| 6,084,479 A | 7/2000 | Duffy et al. |
| 6,087,865 A | 7/2000 | Bradley |
| 6,157,670 A | 12/2000 | Kosanovic |
| 6,170,073 B1 | 1/2001 | Jarvinen et al. |
| 6,173,423 B1 | 1/2001 | Autechaud et al. |
| 6,182,248 B1 | 1/2001 | Armstrong et al. |
| 6,188,255 B1 | 2/2001 | Mann et al. |
| 6,188,702 B1 | 2/2001 | Tornetta et al. |
| 6,198,353 B1 | 3/2001 | Janesch et al. |
| 6,233,073 B1 | 5/2001 | Bowers et al. |
| 6,275,546 B1 | 8/2001 | Miller et al. |
| 6,295,010 B1 | 9/2001 | Thiesfeld |
| 6,304,984 B1 | 10/2001 | Neal et al. |
| 6,343,096 B1 * | 1/2002 | Davidsson et al. ........... 375/224 |
| 6,388,478 B1 | 5/2002 | Mann |
| 6,417,703 B1 | 7/2002 | Bradley |
| 6,433,645 B1 | 8/2002 | Mann et al. |
| 6,453,283 B1 * | 9/2002 | Gigi ............................ 704/207 |
| 6,650,721 B1 | 11/2003 | Janesch et al. |
| 6,885,714 B1 | 4/2005 | Matthews et al. |
| 6,886,126 B1 | 4/2005 | Grivna et al. |
| 6,922,439 B2 | 7/2005 | Yamaguchi et al. |
| 7,173,493 B1 | 2/2007 | Smith |
| 2002/0082010 A1 | 6/2002 | Koorapaty et al. |
| 2004/0047408 A1 * | 3/2004 | Koenenkamp et al. ....... 375/224 |
| 2004/0223538 A1 * | 11/2004 | Zeira ............................ 375/148 |
| 2006/0040653 A1 | 2/2006 | Ratford et al. |
| 2006/0145769 A1 * | 7/2006 | Vaananen et al. ............... 331/16 |
| 2006/0258311 A1 | 11/2006 | Pestryakov et al. |
| 2007/0244656 A1 | 10/2007 | Cranford et al. |

FOREIGN PATENT DOCUMENTS

| | | |
|---|---|---|
| JP | 297223 A1 | 12/1991 |
| WO | WO8906456 A1 | 7/1989 |
| WO | 9617305 A1 | 6/1996 |
| WO | 9834376 A1 | 8/1998 |
| WO | 9909712 A1 | 2/1999 |

OTHER PUBLICATIONS

L. Richard Carley, "Trimming Analog Circuits Using Floating-Gate Analog MOS Memory," IEEE Journal of Solid-State Circuits, vol. 24, No. 6, Dec. 1989, pp. 1569-1575; 7 pages.

"200-MBaud HOTLink Transceiver," Cypress Semiconductor Corporation, Revised Feb. 13, 2004, CY7C924ADX, Document #38-02008 Rev. D; 62 pages.

"A microprogrammable processor using single poly EPROM", by Kenneth J. Schultz et al., Integration, the VLSI journal 8 (1989) pp. 189-199; 11 pages.

"HOTLink Transmitter/Receiver," Cypress Semiconductor Corporation, Revised Aug. 29, 2005, CY7B923, CY7B933, Document #38-02017 Rev. E; 33 pages.

Alvarez et al., "A Wide-Bandwidth Low-Voltage PLL for PowerPC Microprocessors," Motorola, 1994, Symposium on VLSI Circuits Digest of Technical Papers, pp. 37-38; 2 pages.

U.S. Appl. No. 11/403,509: "Recursive Range Controller" Edward L. Grivna et al., filed on Apr. 12, 2006; 35 pages.

Cacharelis et al., "A Fully Modular 1 um CMOS Technology Incorporating EEPROM, EPROM and Interpoly Capacitors," 20th European Solid State Device Research Conference, Nottingham, Sep. 1990, pp. 547-550; 4 pages.

Cacharelis et al., "A Modular 1 um CMOS Single Polysilicon EPROM PLD Technology," Aug. 1988 IEEE, pp. 60-IEDM 88 to 63-IEDM 88; 4 pages.

Cuppens et al., "An EEPROM for Microprocessors and Custom Logic," IEEE Journal of Solid-State Circuits, vol. SC-20, No. 2, Apr. 1985, pp. 603-608; 6 pages.

Cypress CY7C955, "AX ATM-SONET/SDH Transceiver," Jul. 1997, pp. 2-76; 77 pages.
Cypress Data Communications Data Book, CY7B923 CY7B933, "HOTLink Transmitter/Receiver," 1996, pp. 4-1 to 4-27; 28 pages.
Cypress Data Communications Data Book, CY7B951 Local Area Network ATM Transceiver, 1996, pp. 3-1 to 3-8; 9 pages.
Cypress Data Communications Data Book, CY7B952, "SONET/SDH Serial Transceiver," 1996, pp. 3-9 to 3-15; 8 pages.
Cypress Semiconductor Corporation, "CY7B991 and CY7B992 (RoboClock) Test Mode," Jun. 1996, pp. 6-77 to 6-80; 4 pages.
Cypress Semiconductor Corporation, "Everything You Need to Know About CY7B991/CY7B992 (RoboClock) But Were Afraid to Ask," Jun. 1996, pp. 6-1 to 6-40; 41 pages.
Cypress Semiconductor Corporation, "Generation of Synchronized Processor Clocks Using the CY7B991 or CY7B992," Jun. 1996, pp. 7-81 to 7-85; 5 pages.
Cypress Semiconductor Corporation, "Innovative CY7B991/CY7B992 RoboClock Applications," 2007; 10 pages.
Cypress Semiconductor Corporation, "Innovative Designs with the CY7B991/2/10/20 (RoboClock) Programmable Skew Clock Buffer," Jun. 1996, pp. 7-74 to 7-80; 7 pages.
Cypress Semiconductor Corporation, "Interfacing the CY7B923 and CY7B933 (HOTLink) to Clocked FIFOs," Mar. 1999, pp. 1-7; 7 pages.
Cypress Semiconductor Corporation, "Programmable Skew Clock Buffer (PSCB)," CY7B991/CY7B992, 1995, pp. 1-13; 13 pages.
Cypress Semiconductor Corporation, "Single-channel HOTLink II Transceiver," Revised Mar. 2005, pp. 1-3; 3 pages.
Cypress Semiconductor Marketing Brochure, "Timing Technology Products," Published Nov. 1993, a publication of Cypress Semiconductor in San Jose, Ca, pp. 5-7; 5 pages.
Electronic Engineering Times, "TI's Quantum Leap," Issue 517, Dec. 19, 1988, pp. 1 and 86; 2 pages.
Frake et al., "A 9ns, Low Standby Power CMOS PLD with a Single-Poly EPROM Cell," 1989 IEEE International Solid-State Circuits Conference, Feb. 17, 1989, pp. 230-231 and 346; 3 pages.
Hoe et al., "Cell and Circuit Design for Single-Poly EPROM," IEEE Journal of Solid-State Circuits, vol. 24, No. 4, Aug. 1989, pp. 1153-1157; 5 pages.
Kazerounian et al., "A Single Poly EPROM for Custom CMOS Logic Applications," IEEE 1986 Custom Integrated Circuits Conference, 1986, pp. 59-62; 4 pages.
Miyamoto et al., "An Experimental 5-V-Only 256-kbit CMOS EEPROM with a High-Performance Single-Polysilicon Cell," IEEE Journal of Solid State Circuits, vol. SC-21, No. 5, Oct. 1986, pp. 852-860; 9 pages.
Ohsaki et al., "A Planar Type EEPROM Cell Structure by Standard CMOS Process and Applications," VLSI Technology, Digest of Technical Papers, May 1993, pp. 55-66; 2 pages.
Ohsaki et al., "A Planar Type EEPROM Cell Structure by Standard CMOS Process for Integration with GATE Array, Standard Cell, Microprocessor and for Neural Chips," IEEE 1993 Custom Integrated Circuits Conference, 1993, pp. 23.6.1-23.6.4; 4 pages.
Ohsaki et al., "A Single Poly EEPROM Cell Structure for Use in Standard CMOS Processes," IEEE Journal of Solid-State Circuits, vol. 29, No. 3, Mar. 1994, pp. 311-316; 6 pages.
Ohsaki et al., "SIPPOS (Single Poly Pure CMOS) EEPROM Embedded FPGA by News Ring Interconnection and Highway Path," IEEE 1994 Custom Integrated Circuits Conference, 1994, pp. 189-192; 4 pages.
Roger L. Freeman, "Practical Data Communications," 1995, John Wiley & Sons Inc., pp. 130 to 286; 49 pages.
S.M. Sze, "Physics of Semiconductor Devices," 2nd Edition, John Wiley & Sons, New York, 1981, pp. 496-506; 13 pages.
Shariatdoust et al., "A Low Jitter 5 MHz to 180 MHz Clock Synthesizer for Video Graphics," AT&T Bell Laboratories, IEEE, 1992, Custom Integrated Circuits Conference, pp. 24.2.1-24.2.5; 5 pages.
Sugino et al., "Analysis of Writing and Erasing Procedure of Flotox EEPROM Using the New Charge Balance Condition (CBC) Model," NUPAD IV, May and Jun. 1992, pp. 65-69; 5 pages.
T.J. Giles, "A University Frequency Synthesizer IC," Aug. 1979, Philips Telecommunication Review, vol. 37, No. 3, pp. 177-181; 6 pages.
Takebuchi et al., "A Novel Integration Technology of EEPROM Embedded CMOS LOGIC VLSI Suitable for ASIC Applications," IEEE 1992 Custom Integrated Circuits Conference, 1992, pp. 9.6.1-9.6.4; 4 pages.
USPTO Corrected Notice of Allowance for U.S. Appl. No. 09/534,108 dated Dec. 17, 2004; 3 pages.
USPTO Final Rejection for U.S. Appl. No. 09/048,905 dated Feb. 8, 2002; 6 pages.
USPTO Final Rejection for U.S. Appl. No. 09/048,905 dated Oct. 15, 1999; 8 pages.
USPTO Final Rejection for U.S. Appl. No. 09/161,821 dated Jul. 19, 2000; 10 pages.
USPTO Non Final Rejection for U.S. Appl. No. 11/403,509 dated Sep. 14, 2009; 13 pages.
USPTO Non-Final Rejection ("Paper No. 6") and one page of the following amendment identifying the Non-Final Rejection as "Paper No. 6" for U.S. Appl. No. 08/622,539 dated Feb. 10, 1997; 2 pages.
USPTO Non-Final Rejection for U.S. Appl. No. 08/259,323 dated Oct. 6, 1994; 7 pages.
USPTO Non-Final Rejection for U.S. Appl. No. 08/549,915 dated May 24, 1996; 3 pages.
USPTO Non-Final Rejection for U.S. Appl. No. 08/777,304 dated Jun. 8, 1998; 7 pages.
USPTO Non-Final Rejection for U.S. Appl. No. 08/777,304 dated Dec. 8, 1997; 8 pages.
USPTO Non-Final Rejection for U.S. Appl. No. 08/865,342 dated Feb. 3, 1998; 3 pages.
USPTO Non-Final Rejection for U.S. Appl. No. 08/865,342 dated Apr. 8, 1998; 5 pages.
USPTO Non-Final Rejection for U.S. Appl. No. 09/048,905 dated Feb. 15, 2001; 12 pages.
USPTO Non-Final Rejection for U.S. Appl. No. 09/048,905 dated Jun. 3, 1991; 5 pages.
USPTO Non-Final Rejection for U.S. Appl. No. 09/048,905 dated Jul. 24, 2001; 10 pages.
USPTO Non-Final Rejection for U.S. Appl. No. 09/048,905 dated Aug. 22, 2000; 12 pages.
USPTO Non-Final Rejection for U.S. Appl. No. 09/086,124 dated Sep. 13, 1999; 6 pages.
USPTO Non-Final Rejection for U.S. Appl. No. 09/161,821 dated Jan. 24, 2000; 10 pages.
USPTO Non-Final Rejection for U.S. Appl. No. 09/534,108 dated Apr. 24, 2003; 6 pages.
USPTO Non-Final Rejection for U.S. Appl. No. 09/534,108 dated Nov. 21, 2002; 8 pages.
USPTO Non-Final Rejection for U.S. Appl. No. 09/782,482 dated Sep. 24, 2001; 7 pages.
USPTO Non-Final Rejection for U.S. Appl. No. 09/865,208 dated Oct. 4, 2004; 6 pages.
USPTO Notice of Allowance for U.S. Appl. No. 08/259,323 dated Mar. 21, 1995; 1 page.
USPTO Notice of Allowance for U.S. Appl. No. 08/549,915 dated Apr. 8, 1997; 3 pages.
USPTO Non-Final Rejection for U.S. Appl. No. 08/622,539 dated Jun. 25, 1997; 3 pages.
USPTO Notice of Allowance for U.S. Appl. No. 08/777,304 dated Jan. 4, 1999; 3 pages.
USPTO Notice of Allowance for U.S. Appl. No. 08/865,342 dated Sep. 16, 1998; 1 page.
USPTO Notice of Allowance for U.S. Appl. No. 09/047,595 dated Apr. 16, 1999; 2 pages.
USPTO Notice of Allowance for U.S. Appl. No. 09/048,905 dated May 29, 2002; 4 pages.
USPTO Notice of Allowance for U.S. Appl. No. 09/086,124 dated Feb. 28, 2000; 3 pages.
USPTO Notice of Allowance for U.S. Appl. No. 09/161,821 dated Sep. 25, 2000; 10 pages.
USPTO Notice of Allowance for U.S. Appl. No. 09/534,108 dated Sep. 23, 2003; 4 pages.
USPTO Notice of Allowance for U.S. Appl. No. 09/782,482 dated Jan. 2, 2002; 7 pages.
USPTO Notice of Allowance for U.S. Appl. No. 09/865,208 dated Dec. 16, 2004; 6 pages.

USPTO Notice of Allowance for U.S. Appl. No. 11/001,992 dated Oct. 5, 2006; 6 pages.
USPTO Notice of Allowance for U.S. Appl. No. 11/403,509 dated Jan. 6, 2011; 8 pages.
USPTO Notice of Allowance for U.S. Appl. No. 11/403,509 dated Feb. 17, 2010; 7 pages.
USPTO Notice of Allowance for U.S. Appl. No. 11/403,509 dated Apr. 15, 2011; 9 pages.
USPTO Notice of Allowance for U.S. Appl. No. 11/403,509 dated May 20, 2010; 8 pages.
USPTO Notice of Allowance for U.S. Appl. No. 11/403,509 dated Jul. 29, 2011; 9 pages.
USPTO Notice of Allowance for U.S. Appl. No. 11/403,509 dated Sep. 20, 2010; 8 pages.
Yoshikawa et al., "An EPROM Cell Structure for EPLD's Compatible with Single Poly-Si Gate Processes," IEEE Transactions on Electron Devices, vol. 37, No. 3, Mar. 1990, pp. 675-679; 5 pages.

* cited by examiner

RECURSIVE RANGE CONTROLLER

RELATED APPLICATIONS

This application is a continuation of U.S. patent application Ser. No. 11/403,509 filed Apr. 12, 2006, now issued as U.S. Pat. No. 8,073,042 on Dec. 6, 2011, which claims priority to U.S. Provisional Application No. 60/671,388 filed on Apr. 13, 2005, both of which are hereby incorporated by reference herein.

TECHNICAL FIELD

This invention relates generally to a range controller and, more particularly, to a recursive range controller.

BACKGROUND

Communications links, due to distance, are normally specified as synchronous or plesiochronos in nature, and in the presence of link errors or faults, may receive input streams at completely uncontrolled signaling rates. Examples of such communication links include SONET, OTN, Fibre Channel, Ethernet, InfiniBand, Serial ATA, SAS (serial attached SCSI), and some forms of PCI Express. Some of these links may be configured to transmit using a recovered clock (e.g., SONET), though most transmit using a local reference clock so as to limit any jitter transfer from a recovered clock.

All of these interfaces specify maximum allowed tolerance of the local reference clock, or maximum offset between the reference clock at the transmitting and receiving ends of a link. For SONET links this offset is normally specified as low as 20 ppm, while for Fibre Channel it can be as high as +/−100 ppm.

The logic that processes received data needs to process at least some portion of the data in the recovered clock domain. This logic is normally designed to operate over the normal or "operating" range of the system signaling rate, plus some small margin. However, in the case of a fiber break or similar fault, the receiver in the communication system may start processing noise as if it were data. When the receive phase locked loop (PLL) attempts to track the uncontrolled transitions in this noise, it can speed up to much faster than the normal operating range of the system. Typical voltage controller oscillators (VCOs) can operate at 2× or faster than their target operating frequency. If the downstream data-processing logic were presented with a clock this far out of specification, the logic would suffer multiple errors due to setup and hold violations.

To prevent this from happening, range-control hardware is added to the clock recovery hardware to limit the range of operation of the recovered clock to that which the downstream logic can tolerate. When an out-of-specification data stream is detected, the clock recovery circuit is directed to ignore the received data, and instead lock onto a local controlled signal that is within the allowed range of operation.

For these range-control circuits to work, they need to be able to respond to all of the potential link-fault conditions before the recovered clock presents an out of specification clock to the downstream logic. Likewise, it must also detect and report variations in link signaling rate that do not cause a permanent out-of-specification clock, but do present an invalid clock for a short period. However, tradeoffs in PLL bandwidth vs. phase noise are often necessary that allow the VCO to move faster than the evaluation period needed to ensure proper operating range. This leaves the user with a "hole" where, when presented with some types of external conditions, the normal range-control logic cannot detect the out-of-spec condition until the system is substantially out of specification, if at all.

BRIEF DESCRIPTION OF THE DRAWINGS

The present invention is illustrated by way of example, and not by way of limitation, in the figures of the accompanying drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form in order to avoid unnecessarily obscuring an understanding of this description.

References in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment. The term "coupled" as used herein may include both directly coupled and indirectly coupled through one or more intervening components.

A recursive range controller is described. In one embodiment, the range controller detects frequency excursions of a VCO outside the allowed operating range. This may be performed by comparing the number of clocks (generated by the VCO), occurring within a known or fixed time window, to an allowed range of values. The time window is usually created by a counter running from a known or fixed clock frequency. This may be performed to ensure that the VCO for the clock-recovery (or transmit) PLL is operating at the frequency of the received data stream (instead of a harmonic of that frequency), and that the frequency is within allowed tolerance limits.

Figure 1A:
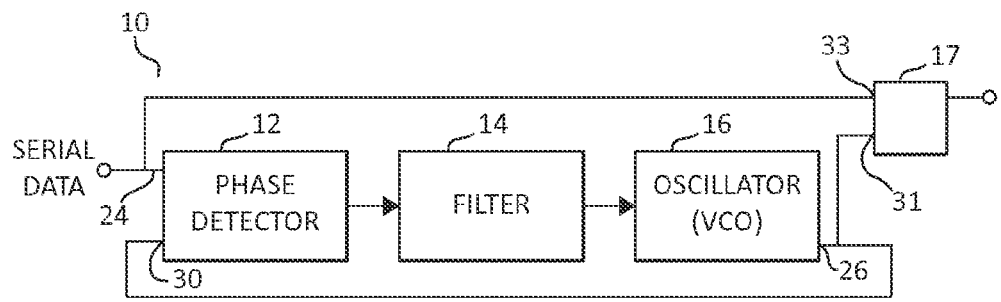
FIG. 1A is a block diagram illustrating an example of a PLL-based clock and data separator.

FIG. 1A illustrates a block diagram illustrating one type of a conventional clock recovery phase locked loop circuit 10. The circuit 10 generally comprises a phase detector 12, a filter 14, an oscillator 16, and a decoding device 17. This type of phase locked loop is used to synchronize a clock frequency 26 with serial data 33 such that the data can be recovered correctly.

Serial data is presented to an input 24 of the phase detector 12. The phase detector 12 is generally coupled to the oscillator 16 through the filter 14. An output 26 of the oscillator 16 is presented to an input 30 of the phase detector 12 as well as to an input 31 of the decoding device 17. The decoding device 17 also has an input 33 that receives the serial data input. The circuit 10 is generally used to provide a properly timed clock (i.e., a clock at the same rate as the serial data, and with proper phase alignment to ensure adequate time margins) to the decoding device 17.

A typical voltage controlled oscillator (VCO) has the capability to operate over a wide frequency range to (i) provide a flexible frequency of operation and (ii) accommodate process and environmental variations. A phase detector (PD) only reports phase error and is insensitive to the frequency of operation of the PLL. This insensitivity is required since serial data consists of variable width marks (or 1) and variable width spaces (or 0). The transitions, when they occur, are at predictable intervals, but the data stream has no intrinsic operating frequency because of the nature of the serial data stream. It is difficult for a conventional PLL to correct for frequency error when decoding serial data. Edges generally occur at approximately regular intervals of an input clock (i.e., the intrinsic operating frequency), but gross errors in clock rate can be misinterpreted as data running at another frequency.

One problem associated with the circuit 10 may occur when the VCO 16 operates at a harmonic (e.g., one half, twice, or other multiples) of the data rate of the serial data input. In such a case, the phase detector 12 will not report the error, but will instead indicate proper phase alignment. This occurs while the oscillator 16 provides an out of tolerance clock to the decoder device 17. Another problem occurs when the frequency of oscillation of the signal at the output 26 is out of tolerance by a large amount. A range controller, further described in FIG. 1A, coupled to the oscillator 16 may be used to detect whether the VCO 16 is operating within an operating range.

One approach to remedying the problem associated with the VCO 16 operating at a harmonic of the serial data input is to limit the operating range of the VCO, as closely as possible, to a small percentage around an expected data rate. In such a system a trimmed oscillator, or tunable oscillator, may be used to provide such a correction.

Figure 1B:
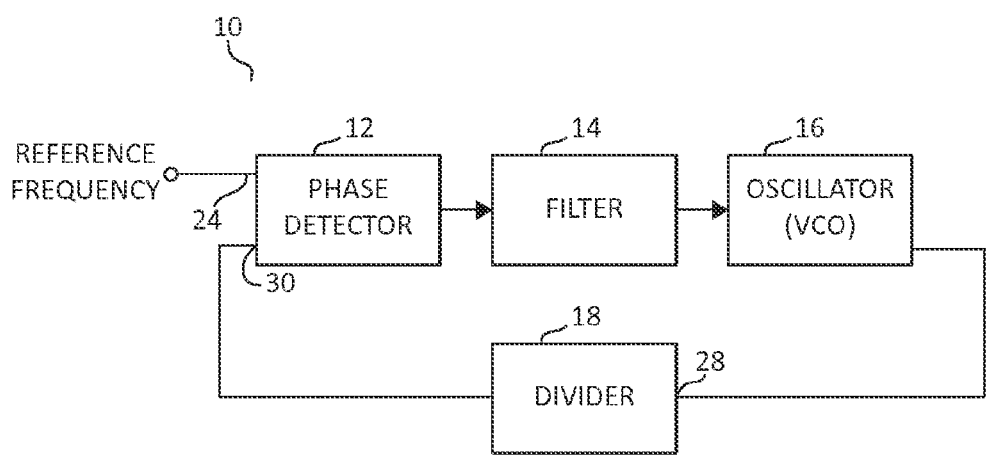
FIG. 1B is a block diagram illustrating an example of a clock multiplication phase lock loop circuit.

Referring to FIG. 1B, another conventional phase locked loop circuit 10' is shown. This type of phase locked loop is generally used to multiply a reference frequency by some multiple set by a feedback divider. The circuit 10' generally substitutes a phase frequency detector 20 for the phase detector 12. The phase frequency detector 20 is generally coupled to the oscillator 16 through the filter 14. A divider circuit 18 has an input 28 that receives the output of the oscillator 16. The divider 18 generally presents a signal to the input 30 of the phase frequency detector 20. The phase frequency detector 20 is capable of indicating both phase error and frequency error though error information presented to the filter 14. Errors coupled through the filter 14 cause the VCO 16 to change its frequency and phase to minimize the error. VCO frequency errors are easily managed by the circuit 10'. The nominal frequency of operation will be the reference frequency multiplied by a divider ratio. A typical phase frequency detector 20 as used in phase locked loop 10' cannot tolerate irregular input data streams that may be found in a serial data input.

Figure 2:
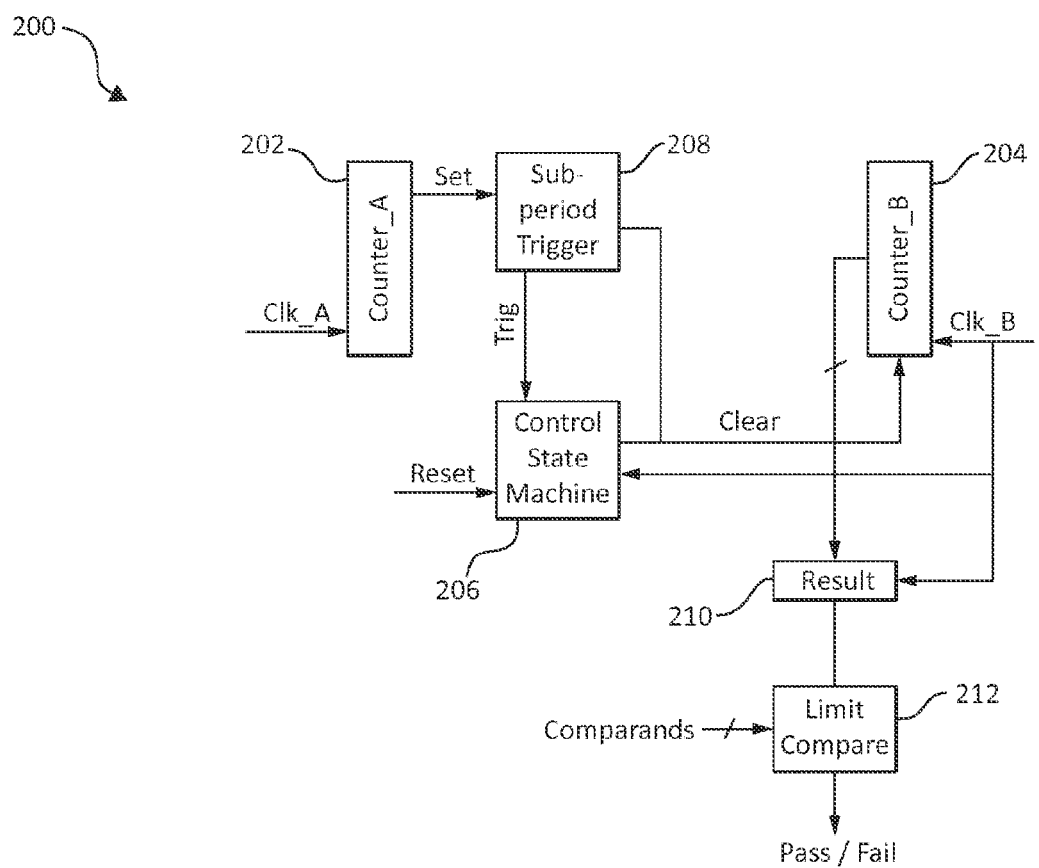
FIG. 2 is a block diagram illustrating a conventional range controller.

FIG. 2 illustrates one type of non-recursive range controller used in conjunction with the phase locked loops 10 and 10' of FIGS. 1A, 1B. The range controller of FIG. 2 is configured to operate with two counters: one counter (Counter_A 202) clocked by the local reference clock (Clk_A), and the other counter (Counter_B 204) clocked by a derivative of the recovered clock Voltage Controller Oscillator (VCO) (Clk_B). At the end of an evaluation period, the count result 210 is compared to a short list of allowed values. If it does not match any of these values, then the VCO is operating out of range, and it is directed to operate in a recovery mode by comparison logic 212. The local reference clock (Clk_A) is used to operate a controlling state machine 206 using a Sub-period trigger input 208. However, this may prevent the system from properly reporting an invalid data stream if this reference clock ever dies or is otherwise disabled. To overcome this, the VCO clock may be used to run the controlling state machine 206, which is then compared to the reference clock (Clk_A).

Several issues may exist with the range controller of FIG. 2. When used in conjunction with the clock and data recovery circuit illustrated in FIG. 1A, the controlling state machine 206 generates events to both enable and disable the alternate counter. Since the alternate counter exists in a separate time domain, these control signals must go through time domain conversion circuits (generally in the form of metastable prevention circuits). Both the start event and the stop event cause one bit of uncertainty in the resulting count, which requires a longer count sequence to achieve the necessary accuracy.

Figure 3:
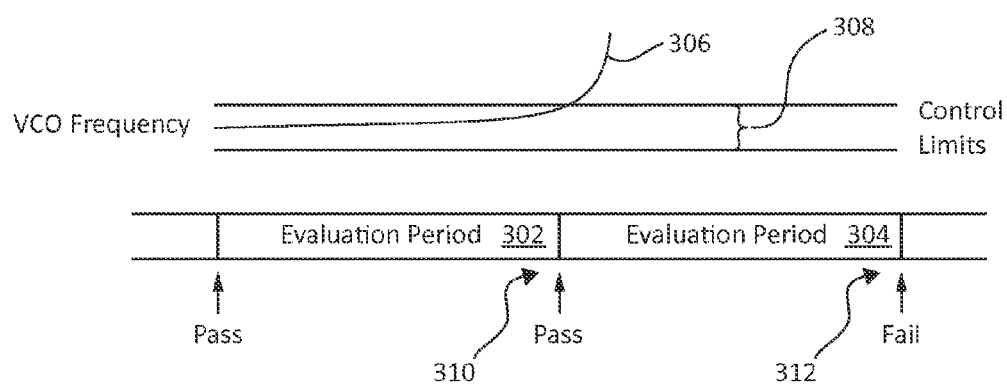
FIG. 3 is a diagram illustrating an example of runaway VCO frequency.

Another issue is that frequency excursions that occur near the start of an evaluation period are not reported as being "out of range" until the end of the evaluation period, as shown in FIG. 3. FIG. 3 illustrates two evaluation periods 302 and 304. Because the VCO frequency 306 is within the allowed operating range 308 at the beginning of the first evaluation period 302 and the beginning of the second evaluation period 304, the VCO frequency 306 passes the test of the comparator logic 212 of FIG. 2. However, use of a range controller such as that described in FIG. 2, results in a system 200 unable to respond to frequency excursions until well after the fact. In the second evaluation period 304, the VCO frequency 306 goes outside the allowed operating range 308. Frequency excursions that occur near the start 310 of the second evaluation period 304 are not reported as being "out of range" until the end 312 of the second evaluation period 304. Because of the length of the evaluation period 304, the VCO frequency 306 can move to a frequency well outside the allowed operating range 308, before the excursion is caught and the VCO 16 is forced to lock a local reference.

Figure 4:
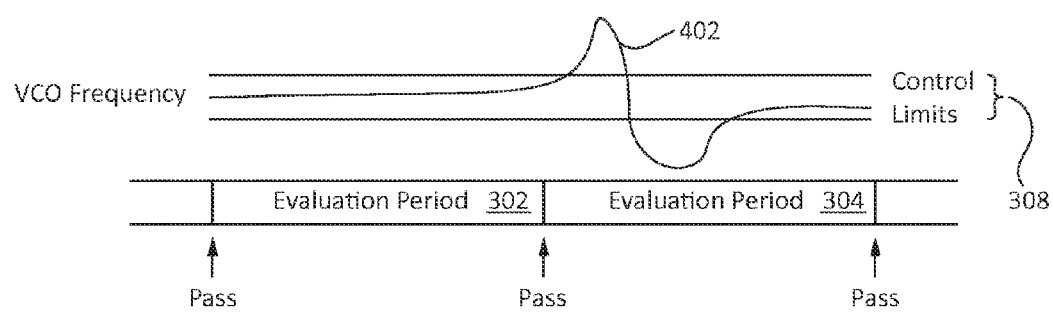
FIG. 4 is a diagram illustrating an example of a non-detected range violation.

Undetected offsetting frequency excursions such as that shown in FIG. 4 may also occur as a result of the system 200 described in FIG. 2. The VCO frequency 402 goes outside the allowed operating range 308 both high and low within the same evaluation period 304. At the beginning and end of the evaluation period 304, the VCO frequency 402 is within the allowed operating range 308. Such offsetting frequency excursion is not detectable within such a system.

Figure 5:
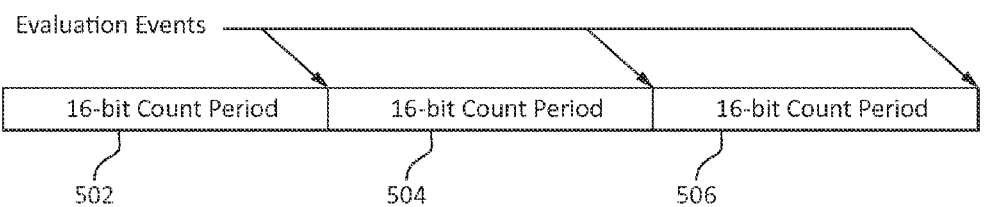
FIG. 5 is a block diagram illustrating an example of an evaluation period.

FIG. 5 illustrates a traditional evaluation period. Each count period 502, 504, 506, may be for example, 16-bits in length. Because of the long evaluation period in this example, events occurring in an early portion of this evaluation period are neither reported or acted upon until the end of the complete evaluation period.

Figure 6:
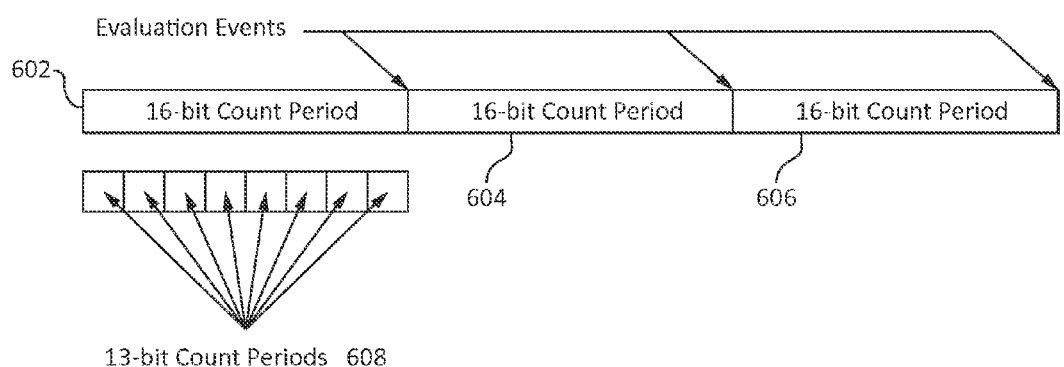
FIG. 6 is a block diagram illustrating an example of sub-period intervals according to one embodiment.

FIG. 6 illustrates an evaluation period in accordance with one embodiment of the invention. Each count period 602, 604, 606, may be for example, 16-bits in length. Each 16-bit count period may also be made from a concatenated sequence of eight 13-bit count sequences 608. Performing an evaluation over one of these shorter periods 608 may not be sufficient to achieve the accuracy needed to determine if the VCO is operating within spec or not. However, by concatenating eight of these sub-periods 608 sequentially, sufficient time is present to validate the frequency. Instead of evaluating over a set of these sub-periods 608, followed by evaluation of the next sequential set of sub-periods 608 (which would yield the same results as evaluating over the full evaluation period), it is possible to start a new evaluation at each sub-period boundary. This creates a continuous stream of overlapped evaluation events, with each event starting at one n-th the normal evaluation period. An example of this is shown in FIG. 7.

Figure 7:
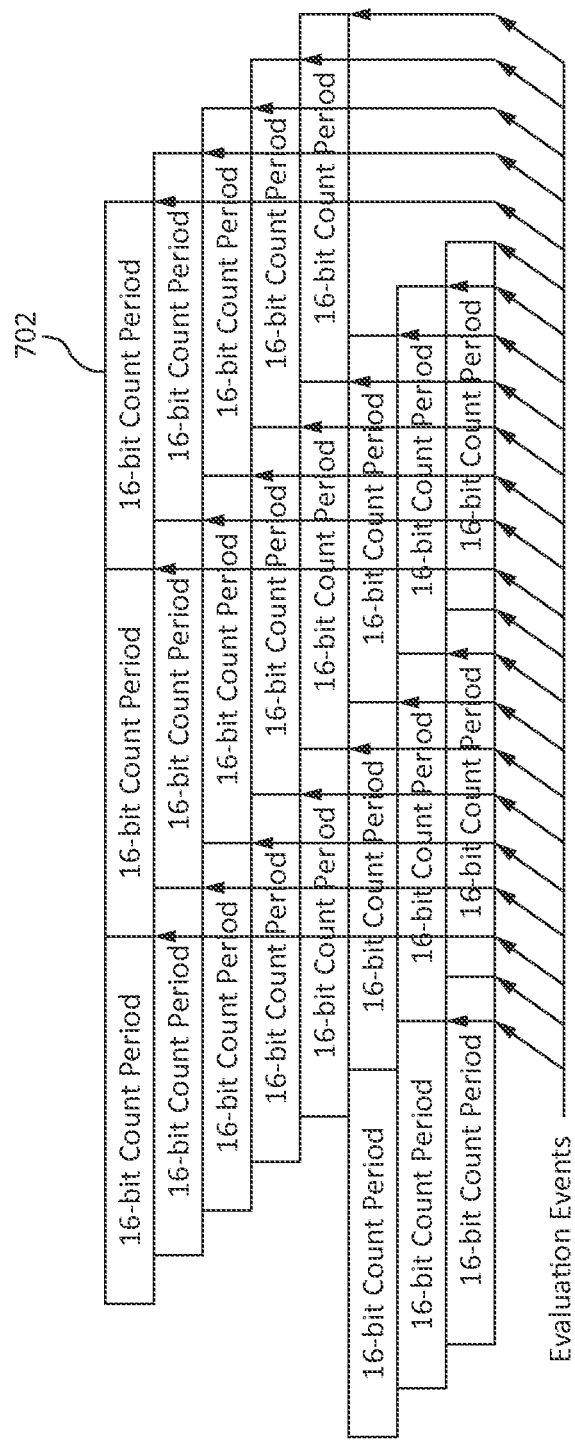
FIG. 7 is a block diagram illustrating an example of overlapped evaluation events according to one embodiment.

FIG. 7 illustrates that each of the overlapped evaluation periods 702 is made from a sequence of n-sub-periods. Since these evaluation periods overlap, the count events that occur in one are also part of n−1 other evaluation periods. An embodiment of the present invention operates by summing the counts that occur in each sub-period, and removing (subtracting) those counts from older sub-periods that no longer are part of the current evaluation period.

Figure 8:
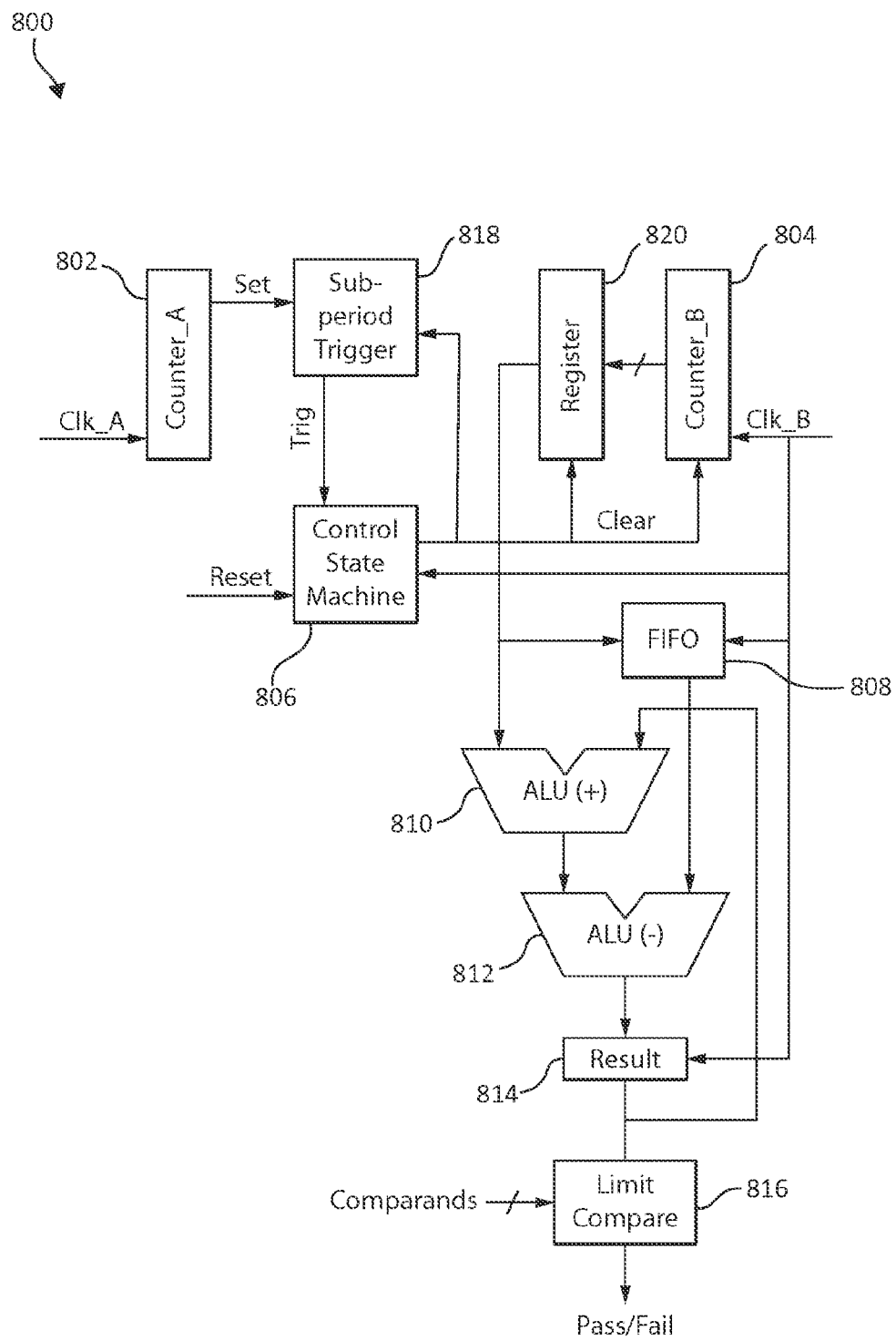
FIG. 8 is a block diagram illustrating a recursive range controller according to one embodiment.

FIG. 8 is a block diagram illustrating one embodiment of a hardware implementation. A range controller 800 has two counters: one for the reference domain, Counter_A block 802, and one for the VCO domain, Counter_B block 804. Counter blocks 802, 804 can be either free running (requiring counter-relative measurements) or synchronous resettable. In one particular embodiment, for fail-safe operation (i.e., valid detection in the absence of a valid reference clock), a controlling state machine block 806 is operated in the VCO time domain. To evaluate the operating frequency to some specific tolerance requires approximately the same total evaluation period of time as with the range controller of FIG. 2. Note that this evaluation period may be shortened, relative to the range controller of FIG. 2, by the one count reduction in measurement uncertainty.

An embodiment of the range controller 800 of the present invention operates by segmentation of the evaluation period into n sub-periods, each of which is the same length, and some multiple of which equal the normal evaluation period. Segmenting the evaluation period into four, eight, or some other fraction allows n-times faster response to events, while allowing detection of high-accuracy limits.

At the end of each sub-period, the value of the Counter_B 804 is captured, processed, and the counter is synchronously set to zero (0). The processing is composed of 1) saving the captured count into a register file or first-in-first-out (FIFO) register block 808 having n-entries, 2) using an arithmetic logic unit (ALU) block 810 or similar logic to sum the captured count with the result from the previous count sum, 3) using the same or similar ALU block 812 to subtract the n-th previous captured count (as saved in the register file) from the summing register, and 4) checking to see if the result block 814 is within the allowed operating bounds.

Unlike the counter blocks 802 and 804, which by default are able to operate at the character or other sub-multiple of the VCO rate, the arithmetic and register file operations occur only once per sub-period, and thus can be created from very slow and low-power circuits, potentially making use of clock gating to further reduce system power.

The ALU result block 814 after summing the present count and subtracting the n-th previous count is the sum of the previous n sub-periods, which is equivalent to the count of one complete evaluation period. Since sufficient counts have occurred, a Limit Compare block 816 determines (to the necessary level of accuracy) whether the VCO is operating within its allowed frequency range. But because a new evaluation is completed n-times in this evaluation period, the previously missed or late-reported events are now both detected and reported at or near the time of the error.

In more detail, FIG. 8 illustrates two clocks (Clk_A and Clk_B). Clk_A is the local reference. Clk_B is the VCO clock. These clocks can be interchanged without impacting operation of the present embodiment. In one embodiment, a failsafe operation is achieved by making Clk_A the recovered (VCO) clock, and placing the local reference clock on Clk_B.

The period of Counter_A block 802 is set equal to the sub-period of the evaluation. Once each sub-period, it sends a Set pulse signal to the Sub-Period trigger block 818, to start the actual evaluation of the current sub-period. This can occur at any time in Counter_A block 802, but must always occur at the same point in Counter_A block 802's evaluation period. This may occur at either the selected maximum (terminal) count of Counter_A block 802, or when Counter_A block 802 restarts at zero.

Counter_B block 804 counts continuously, once per Clk_B input. When a trigger marker is generated by Counter_A block 802, and converted to the Counter_B block 804 time domain, Counter_B block 804's state is transferred to a holding register block 820. The signal used to transfer Counter_B block 804's state to the holding register block 820 may also be used to simultaneously clear Counter_B 804. The sub-period trigger block 818 may also be synchronously cleared to prepare it for the next sub-period trigger.

In one embodiment, the sub-period trigger block 818 may be implemented as a latch, which can only be set from the Clk_A time domain, and can only be cleared from the Clk_B time domain. As an additional failure-detection mechanism, the logic in the Clk_A time domain may verify that the sub-period trigger block 818 is not set prior to attempting to set it. If, when attempting to set the latch, it is found in a set condition, then Clk_B is non-operational and a Fail condition should be generated.

The control state machine block 806 may be needed to initialize the FIFO block 808 and the different registers. While shown as operating directly from Clk_B, this may not be required. Since the operation of the evaluation circuits are non-time sensitive, they can be configured to operate from any reasonable clock, including a divided-down version of Clk_B, and could potentially operate from Clk_A (this would require a second monitor function on the sub-period trigger to ensure that the evaluation did not start until after the trigger was recognized in the Clk_B domain, and the counter value was captured in the holding register block 808), or some other clock source.

Following the removal of system reset, the controlling state machine 806 must ensure that the contents of the FIFO block 808 (or register file) and summing register block 810 are cleared to all zeros. This is necessary to ensure that the first n-cycles are properly summed without stale content in the FIFO block 808. This may be done by physically clearing the FIFO block 808, or mixing a value of zero into the ALU block 812 input from the FIFO block 808 for the first n sub-period cycles.

Those of ordinary skills in the art will recognize that the FIFO block 808 is not limited to a traditional FIFO structure. In an alternative embodiment, the FIFO block 808 may be clocked fully synchronously to the local clock domain, and can be implemented as another type of memory storage element such as a latch, memory cell, etc. Requirements may include that it have a fixed depth of n locations, and that the oldest (n-th) location is not overwritten until it has been subtracted from the current count. As each new count value is written to the FIFO block 808, the previously captured counts are moved down through the FIFO block 808, with each location x in the FIFO block 808 accepting the contents of the x−1 location, and location 0 accepting the newly captured count.

Two ALU 810, 812 operations are required to process each sub-period count: addition of the new count to a running sum, and a subtraction of the n-th FIFO location from that same running sum. It should be noted that as with normal addition and subtraction, these operations are fully commutative and may be done in any order.

The application of the embodiments of the present invention described herein allows fast excursions in frequency to be detected and reported to the system, as well as acted upon to prevent out-of-specification clocks from being driven into the system logic. Moreover, counters may be shortened (fewer bits); uncertainty may be reduced to one bit-time instead of two; evaluations occur multiple times per interval, using overlapped windows, allowing fast response to excursions; and offsetting excursions may be detected.

In an alternative embodiment, to limit the power in the counters 802, 804, the counters 802, 804 can be changed from loadable/resettable to free-running. Grey-code counters may be used for this technical application because only a single-bit changes on any clock cycle, thus lowering the dynamic power significantly. When this is done, the counter state at the end of each sub period is still captured as before, but now contains a relative count instead of absolute count. To convert this relative count to absolute it is necessary to also maintain a saved copy of the previous captured counter state, and perform a subtraction of one from the other.

This subtraction may include carry compensation, since a free-running counter will roll-over regularly. This carry compensation is composed of a magnitude comparison of the two values. If the previous captured value is greater than or equal to the present captured count, then the maximum value of the counter plus one (max_val_count+1) must be added to the present captured count before subtracting the previous captured count. This delta between previous and current count values is then processed the same as in the previously described implementation.

In another embodiment, a hardware intensive implementation of the present invention may be made using multiple instances of the full counter, each started at the next sequential evaluation boundary.

Embodiments of the recursive range controller 800 may enable segmentation of the evaluation period into n sub-periods; use of a register file or FIFO to store intermediate results; the ability to detect link faults in less than a full evaluation period; and/or the ability to detect offsetting frequency excursions. Embodiments of the range controller described herein may be used in high-speed serial communications links. Such links may be used, for example, to replace the parallel interfaces on a static random access memory (SRAM) and a network search engine (NSE), also referred to as a content addressable memory (CAM).

It should be noted that various components described herein may be implemented with other similar types of components. For example, the registers described herein may be implemented as another type of memory storage element such as a latch, memory cell, etc.

Figure 9:
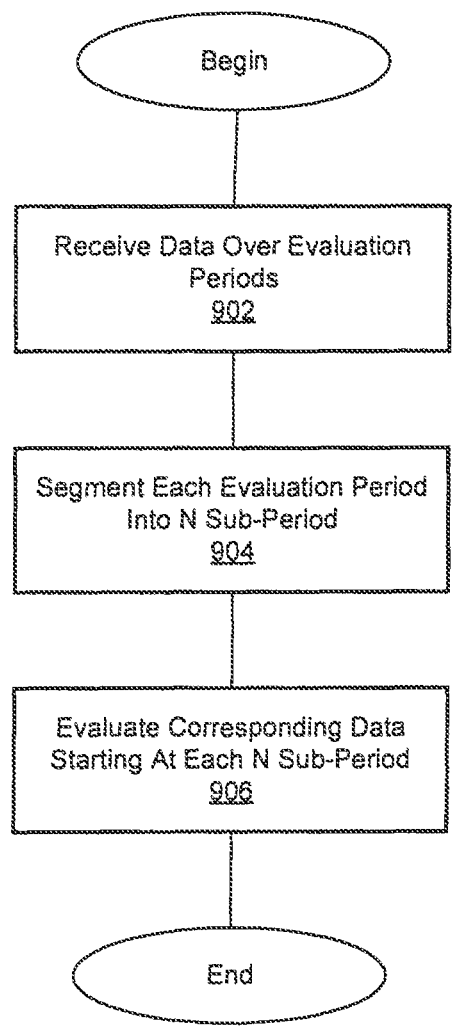
FIG. 9 is a flow diagram illustrating a method for providing a recursive range controller in accordance with one embodiment.

FIG. 9 illustrates a flow diagram illustrating a method for detecting out-of-specification data streams. At 902, data is received over several evaluation periods. At 904, each evaluation period is segmented into n sub-periods. Each sub-period has a same length and spans a corresponding portion of the data. At 906, the corresponding data period starting each of the n sub-periods is evaluated.

Figure 10:
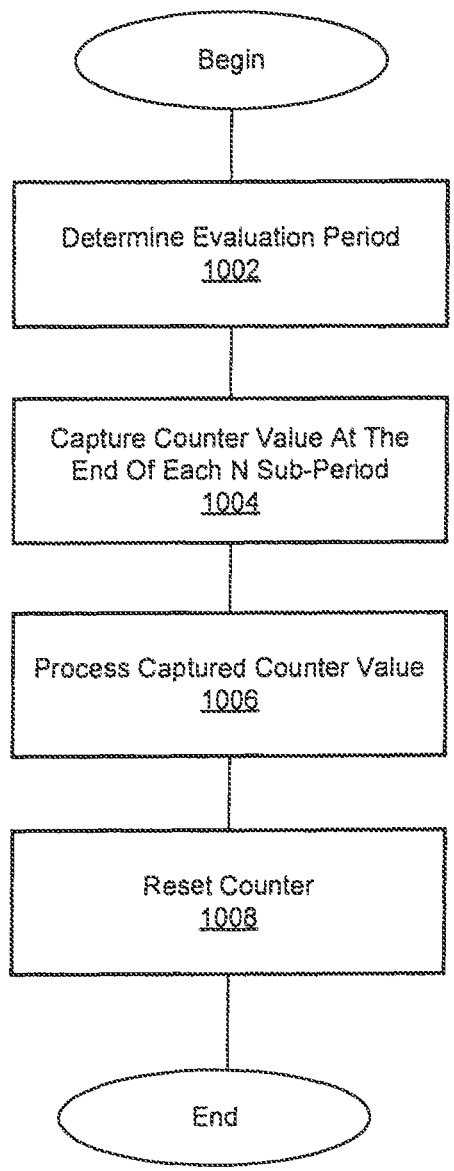
FIG. 10 is a flow diagram illustrating a method for evaluating the corresponding data starting at each of the n sub-periods in accordance with one embodiment.

FIG. 10 illustrates a flow diagram illustrating a method for evaluating the corresponding data starting at each of the n sub-periods. At 1002, the evaluation of the corresponding data period starts at an n-th sub-period of a first evaluation period and finishes at an n-th sub-period of a second evaluation period. At 1004, at the end of each of the n-subperiods, a value of a counter is captured. At 1006, the captured value is processed. At 1008, the counter value is synchronously reset to zero.

Figure 11:
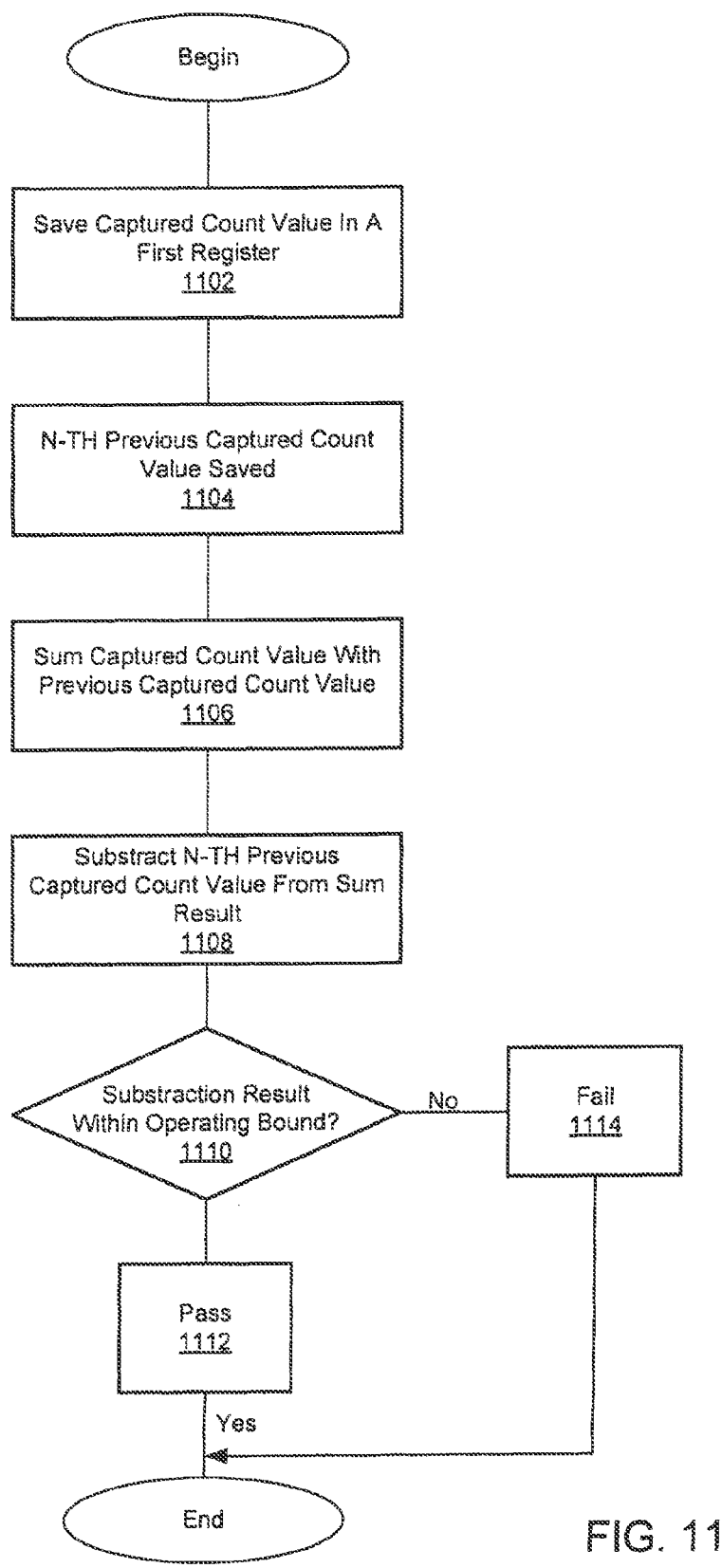
FIG. 11 is a flow diagram illustrating a method for processing the captured value at the end of each n sub-period in accordance with one embodiment.

FIG. 11 illustrates a flow diagram illustrating a method for processing the captured value at the end of each n sub-period. At 1102, the captured count value is saved into a first register. At 1104, an n-th previous captured count is saved. At 1106, a first logic circuit is used to sum the captured count with a result from a previous count sum and generate a summed result. At 1108, a second logic circuit is used to subtract an n-th previous captured count from the summed result to generate a subtraction result. At 1110, the subtraction result is checked to determine whether it is within an allowed operating bound. If the subtraction result is within the allowed operating bound, the test passes at 1112. If the subtraction result is outside the allowed operating bound, the test fails at 1114

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:

receiving data in a data stream over a plurality of evaluation periods;

segmenting each of the plurality of evaluation periods into n sub-periods, where n is an integer greater than one;

evaluating, by a controller circuit, data from the data stream corresponding to a first period of the plurality of evaluation periods; and evaluating data from the data stream corresponding to a second period of the plurality of evaluation periods, wherein the second period shares n−1 sub-periods with the first period, wherein the evaluating of the data corresponding to the first period comprises evaluating the data at an end of each of the n sub periods of the first period and the evaluating of the data corresponding to the second period comprises evaluating the data at an end of each of the n sub periods of the second period.

2. The method of claim 1, further comprising:

determining whether the data from the data stream corresponding to the first and second periods of the plurality of evaluation periods is out-of-specification data.

3. The method of claim 1, wherein each of the plurality of evaluation periods has a same first length and each of the n sub-periods has a same second length.

4. The method of claim 1, wherein evaluating the first and second periods of the plurality of evaluation periods comprises, at an end of each of the n sub-periods:
capturing a value of a counter;
processing the captured value; and
synchronously setting the value of the counter to zero.

5. The method of claim 4, wherein processing the captured value comprises:
saving the captured value of the counter into a first register;
saving an n-th previous captured value of the counter;
summing, by a first logic circuit, the captured value with a result from a previous count sum to generate a summed result;
subtracting, by a second logic circuit, the n-th previous captured value from the summed result to generate a subtraction result; and
determining whether the subtraction result is within a predetermined operating range.

6. The method of claim 5, wherein the subtraction result is substantially equal to a value of the counter corresponding to one evaluation period.

7. An apparatus comprising:
a receiver configured to receive data in a data stream over a plurality of evaluation periods;
a divider coupled to the receiver, the divider configured to segment each of the plurality of evaluation periods into n sub-periods, where n is an integer greater than one; and
an evaluator coupled to the divider, the evaluator configured to:
evaluate data from the data stream corresponding to a first period of the plurality of evaluation periods; and
evaluate data from the data stream corresponding to a second period of the plurality of evaluation periods, wherein the second period shares n−1 sub-periods with the first period, wherein the evaluator is configured to evaluate the data corresponding to the first period at an end of each of the n sub periods of the first period and evaluate the data corresponding to the second period at an end of each of the n sub periods of the second period.

8. The apparatus of claim 7, wherein the evaluator is further configured to determine whether the data from the data stream corresponding to the first and second periods of the plurality of evaluation periods is out-of-specification data.

9. The apparatus of claim 7, wherein each of the plurality of evaluation periods has a same first length and each of the n sub-periods has a same second length.

10. The apparatus of claim 7, wherein the evaluator is configured to evaluate the data from the data stream starting at each of the n sub-periods for a length substantially equal to each of the plurality of evaluation periods.

11. The apparatus of claim 7, wherein the divider comprises:
a first register to capture a value of a counter;
a memory storage element coupled to the first register to store an n-th previous captured value of the counter;
a first logic circuit having a first input coupled to the first register to receive the count, the first logic circuit having a second input to receive a subtraction result, the first logic circuit to sum the count with the subtraction result to generate a summed result;
a second logic circuit coupled to the first logic circuit to receive the summed result, the second logic circuit coupled to the memory storage element to receive the n-th previous captured value, the second logic circuit to subtract the summed result from the n-th previous captured value and generate the subtraction result; and
a result register coupled to the second logic circuit to receive the subtraction result.

12. The apparatus of claim 11, wherein the evaluator comprises:
a comparator coupled to the result register to compare the subtraction result with an input comparand, the input comparand indicating a predetermined operating range of the apparatus.

13. The apparatus of claim 11, wherein the memory storage element comprises a first-in-first-out (FIFO) register.

14. The apparatus of claim 11, wherein the first logic circuit is different than the second logic circuit.

15. The apparatus of claim 11, further comprising:
a first counter to receive a first clock signal;
a second counter to receive a second clock signal, the second counter coupled to the first register;
a sub-period trigger circuit coupled to the first counter; and
a control state machine circuit coupled to the sub-period trigger circuit, the control state machine circuit to receive the second clock signal, and to synchronously reset the sub-period trigger circuit and the second counter, and capture the value of the counter in the first register.

16. The apparatus of claim 15, wherein the first clock signal comprises a local reference clock signal and the second clock signal comprises a recovered clock signal.

17. An apparatus comprising:
a receiver configured to receive data in a data stream over a plurality of evaluation periods;
a divider coupled to the receiver, the divider configured to segment each of the plurality of evaluation periods into n sub-periods, where n is an integer greater than one; and
an evaluator coupled to the divider, the evaluator configured to evaluate data from the data stream corresponding to each of the plurality of evaluation periods, wherein
a first evaluation period comprises a first sub-period through an n-th sub-period of the data stream,
a second evaluation period comprises a second sub-period through an n-th+1 sub period of the data stream, and
each subsequent evaluation period in the data stream is shifted by one sub-period and comprises n sub-periods, wherein the evaluator is configured to evaluate the data corresponding to the first evaluation period at an end of each of the n sub periods of the first evaluation period and evaluate the data corresponding to the second evaluation period at an end of each of the n sub periods of the second evaluation period.

18. The apparatus of claim 17, wherein each of the plurality of evaluation periods has a same first length and each of the n sub-periods has a same second length.

* * * * *